United States Patent [19]

Hungerford et al.

[11] 4,154,124
[45] May 15, 1979

[54] DIGITAL REAR VIEW MIRROR CONTROL

[76] Inventors: Willard Hungerford, 2423 Cleghorn St., Honolulu, Hi. 96815; Alexander Watkins, 633 Por La Mar 315 D, Santa Barbara, Calif. 93103

[21] Appl. No.: 791,781

[22] Filed: Apr. 28, 1977

[51] Int. Cl.² ............................................. F16C 1/10
[52] U.S. Cl. ............................... 74/501 M; 74/98; 74/527
[58] Field of Search ............ 74/501 M, 471 XY, 120, 74/553, 29, 10.39, 89.11, 89.12, 89.20, 527, 98, 99

[56] References Cited

U.S. PATENT DOCUMENTS

| | | | |
|---|---|---|---|
| 3,195,358 | 7/1965 | Davidson | 74/527 |
| 3,200,907 | 8/1965 | Hansen | 74/99 |
| 3,238,800 | 3/1966 | McCord | 74/98 |
| 3,442,150 | 5/1969 | Brauner | 74/501 M |
| 3,924,344 | 6/1976 | Horvath | 74/29 |

Primary Examiner—Benjamin W. Wyche
Assistant Examiner—Gerald A. Anderson

[57] ABSTRACT

An external vehicular rearview mirror assembly comprises a reflective mirror element which is adjustable about two perpendicular axes by means of a pair of Bowden wire cables operated from within the vehicle by two dials or knobs which are digital insofar as each knob is selectively positionable at one of several discrete positions which are indexed so that the exact positioning of the mirror can be unerringly duplicated.

4 Claims, 6 Drawing Figures

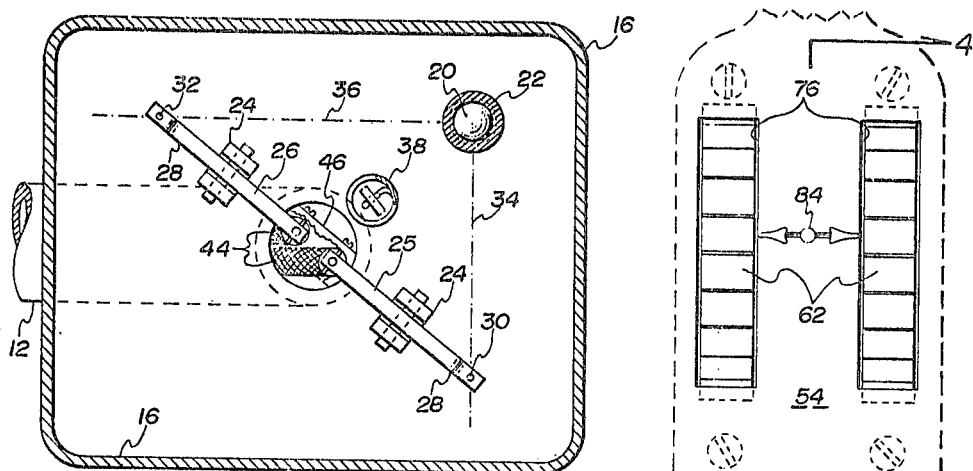
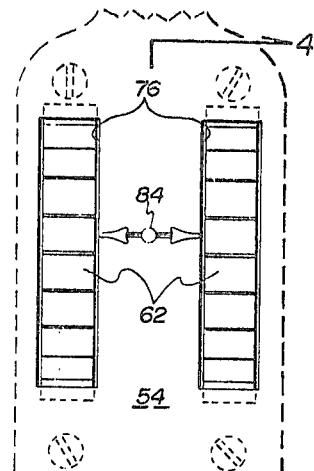
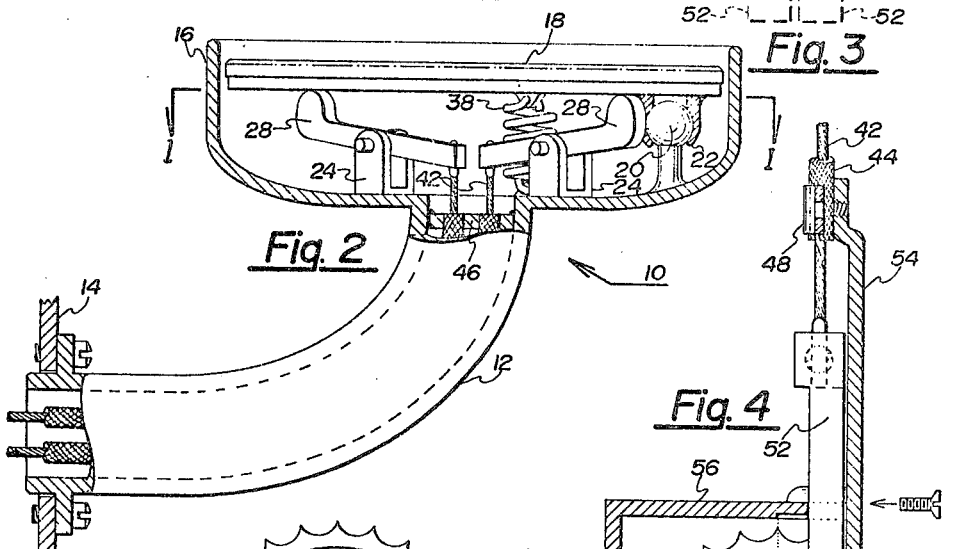
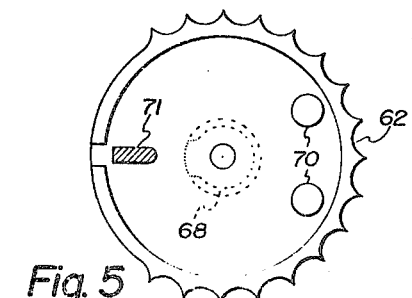
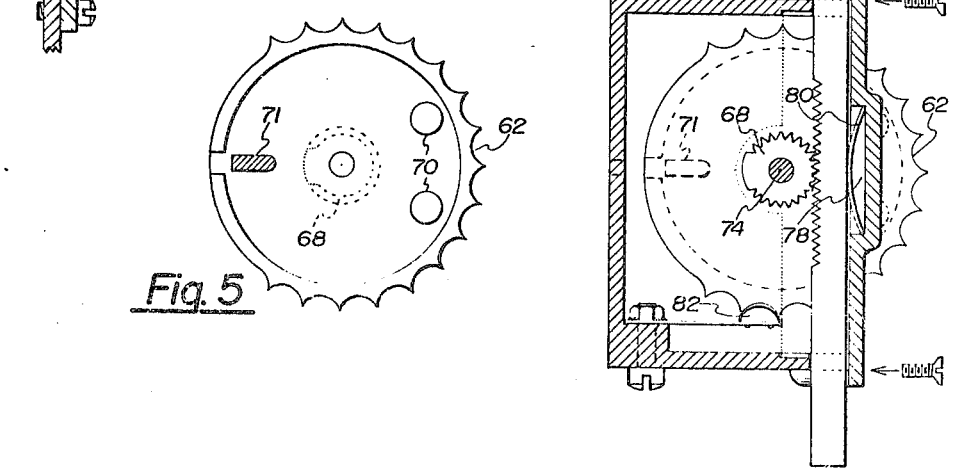

DIGITAL REAR VIEW MIRROR CONTROL

BACKGROUND OF THE INVENTION

The invention is in the field of external rearview mirrors which are controlled by the driver from inside the vehicle.

Especially in the last ten years, numerous types of interiorly controlled external mirrors have been developed, the most popular type being operated by a single swivel-mounted toggle on the driver's door panel, this toggle being connected in one way or another through cables to the reflective mirror element. This type of device, as well as the others that are in use, suffers from the failing that when the mirror is displaced from its proper position for one driver, or when another driver operates the vehicle, it must be painstakingly reset by trial and error. This resetting is problematic in any event, but is especially undesirable if the driver does not notice that adjustment is necessary until he enters a freeway. The danger of deflecting the eyes from the forward roadway for the period of time necessary to adjust the outside mirror by remote control is in current metropolitan traffic conditions is obvious.

SUMMARY OF THE INVENTION

The present invention avoids the above-mentioned danger and problem by providing a rearview mirror which is adjustable about two orthogonal axes by means of a pair of digital knobs which have a number of "clicks" or incremental settings such that the driver may judge the number of clicks from the base setting by feel without requiring visual reference to anything. The knobs may be indexed by numbers, or the like, so that a particular combination of numbers will always yield the proper mirror setting for one particular driver and the driver can initially determine the number of clicks required for his setting.

Thus not only is the mirror very simply readjusted for a husband and wife who use the same car, but a whole family or any number of people can share the same vehicle without the usual nuisance of mirror readjustment. Although the invention is designed for external rearview mirrors, it could be used in modified form for internal mirrors as well. However, internal rearview mirrors are more simply adjusted because they can be moved directly by the hand and because the rear window of the vehicle serves as an alignment references which is not present when trying to adjust the outside mirror.

Although numerous interior control mechanisms could be selected, the one illustrated comprises a pair of parallel dials, each having a coaxial pinion gear which operates a rack gear which in turn moves the cable wire, the other ends of the two wires being connected to levers which are part of a novel mirror element support system disclosed below.

BRIEF DESCRIPTIONS OF THE DRAWINGS

FIG. 1 is a sectional elevational view of the rear of the mirror element taken along lines 1—1 of FIG. 2;

FIG. 2 is a horizontal sectional view of the mirror portion showing the lever, pivot, and spring mechanisms, and also showing connecting cables and mirror element housing;

FIG. 3 is a front elevational view of the control dials as they appear from inside the vehicle;

FIG. 4 is a sectional view taken between the dials along the line 4—4 of FIG. 2 showing the rack and pinion structure;

FIG. 5 is an elevational view of the inside of a dial showing the scalloped edge and the stops;

DETAILED DESCRIPTION OF THE PREFERRED EMBODIMENT

Figure 6:
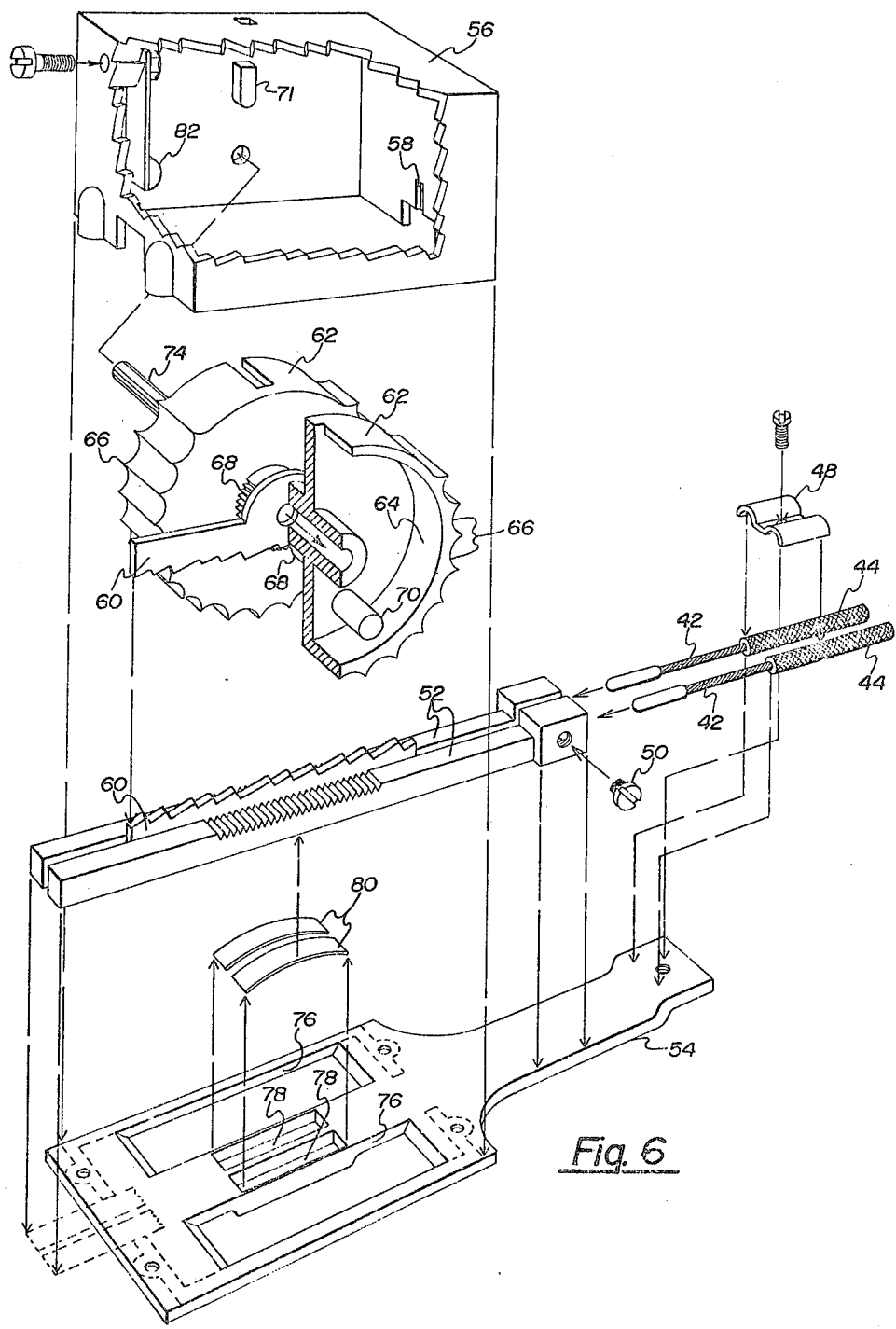
FIG. 6 is an exploded perspective view of the control portion of the device.

The external portion of a rearview mirror is shown in FIG. 2 at 10 supported by an arm 12 from the side 14 of a vehicle. A housing 16 is connected to this arm, which serves to shield the mirror element 18 from wind and weather.

The mirror element 18 engages a ball 20 which is mounted to the interior of the housing 16 by means of a snap-on socket 22 molded of rubber or other slightly expansible composition. A pair of mounting forks 24 are also mounted to the interior of the housing 16 and act as fulcrums for levers 25 and 26 which contact the rear surface of the mirror by means of enlarged bosses 28 on the ends thereof at points 30 and 32, respectively, defining a substantiant vertical axis 34 and a substantially horizontal axis 36. It can be seen from an examination of FIG. 1 that by operating the levers individually, the mirror will be made to rotate about the axis defined by the other lever. In other words, pressure applied by lever 26 against the rear surface of the mirror will adjust the mirror element about vertical axis 34, whereas adjustment about the horizontal axis is effected by movement of the lever 25.

A coil tension spring 38 is utilized to insure the mirror is always biased against its three support points, and an accordian skirt may be added to insure that the operative mechanism of the mirror is not exposed to dirt and the elements. The inner ends of the levers 25 and 26 are connected to the core elements 42 of Bowden wires, the sheaths 44 of which are engaged in seating member 46.

It should be noted at this point that it is impossible to apply compressive, buckling forces to the cable cores by manipulating the mirror element 18 directly because of the reversing action of the levers 25 and 26. Because it is only possible to exert tensile forces on these core elements, a principal cause of jamming and subsequent inoperability of Bowden cables has been removed.

It should be clear from the above discription how the mirror element is operated by the cables. FIGS. 3 through 6 illustrate a control assembly mounted to the door panel on the driver's side or an equivalent location to enable the driver to easily manipulate the assembly. The Bowden wire cables enter and are secured by a bracket 48, the cores 42 extending from the sheaths and being gripped by set screws 50 in racks 52.

These racks as seen in FIGS. 3 and 6 are free to slide behind a front plate 54 which would ordinarily be flush with the interior door panel. A casing 56 is mounted behind the front plate and a slot 58 is provided in the forward portion of the casing to seat a divider 60. On each side of the divider is disposed an operative element 62 which includes a disc or dial 64 having scalloped, preferably numbered edges 66, a coaxial fixed pinion gear 68 which engages one of the racks 52, and a pair of stop members 70 which define limits of rotation in both directions because of the presence of the stud 71 molded in the casing 52, as can be easily visualized.

These operative elements are journalled on a pin 74 skewered through the casing and a portion of each dial protrudes forwardly through a rectangular opening 76 and is accessible from the vehicle compartment as can be seen in FIG. 5. The front plate 54 defines a pair of adjacent wells 78, each of which houses a leafspring 80, which urges the respective racks against the pinions to insure that the engagement is positive.

Mounted to the interior of the casing is a detent 82 supported on the end of a leafspring. This detent will engage in scallops 66 to define a plurality of discrete positions for the dials.

In operation, each of the dials 64 is rotated to control a respective one of the directional adjustment capabilities of the mirror element. An indicator 84 is provided on the front plate of the assembly or elsewhere to select one of the numerals from each of the dials so that a combination of two digits will provide information sufficient to set the mirror. Thus, once the mirror has been originally set so that the particular user has the rear visibility that he desires, by remembering the two digits which show up on the dials aligned with the indicator, regardless of what disturbance the mirror element has been through since the last time he drove, the driver will always be able to immediately reset the mirror to his liking.

Because rotation of the dials results in distinctive clicks of the incremental stages of adjustment are reached, the driver need not visually refer to the numbers on the dial but can back them each up to zero with his thumb and click them into the numbered position by feel without ever looking away from the road.

The main features of the invention are, of course, the separation of the adjustment of the mirror element into motion about two independent axes and the control of these two motions separately by a digital, indexed pair of operative elements of one form or another to permit the duplication of the setting by merely selecting two previously-learned numerals or numbers of clicks. Although the dial controls are favored, other mechanisms permitting independent, digital control of cable displacement could be used.

The invention as thus described is universally usable by any number of people with equal convenience, is economical to manufacture and represents no major departure installation-wise from those adjustable external rearview mirrors currently in use so that adaptation would be simplified. The unique mirror element suspension and adjustment system permits the independent adjustment of the mirror about two orthogonal axes and at the same time prevents buckling of the core elements of the Bowden wire cables, which could be caused by compressive forces.

I claim:

1. A remotely operated rearview mirror for a vehicle comprising:
   (a) a reflective mirror element adjustably mounted on said vehicle;
   (b) a manually operated control assembly mounted on said vehicle and operable from the driver's position;
   (c) cable means operatively connecting said mirror element and said control assembly such that operation of said control assembly moves said cable means to effect the adjustment of said mirror about two substantially independent axes;
   (d) Said control assembly having a pair of independent operative elements each movable between a plurality of discrete adjustment positions and each of said operative elements having a detent to releasibly detain said operative element in any selected one of said discrete positions such that incremental movement of said mirror about each of said axes is effected by shifting said operative elements between said positions.

2. Structure according to claim 1 wherein said control assembly includes an indexing means identifying the various positions selectable by said operative element so that a particular mirror position is easily identifyable and repeatable.

3. Structure according to claim 2 wherein said cable means includes a pair of cable elements and said control assembly includes a pair of rack gears connected to said cable elements and said operative elements are rotatable dials accessible for turning from the driver's side of the vehicle and each having a coaxial pinion gear engaging a separate one of said racks, said dials each being provided with numbers successively displayed around the circumference thereof to identify said adjustment positions.

4. Structure according to claim 1 wherein said mirror element has a pivot point at which it is pivotally retained to said support and said cables are operative to displace said mirror elements at points on said mirror element which define mutually orthogonal intersecting lines with said pivot point, whereby said intersecting lines define said substantially independent axes of rotative adjustment of said mirror element.

* * * * *